UNITED STATES PATENT OFFICE.

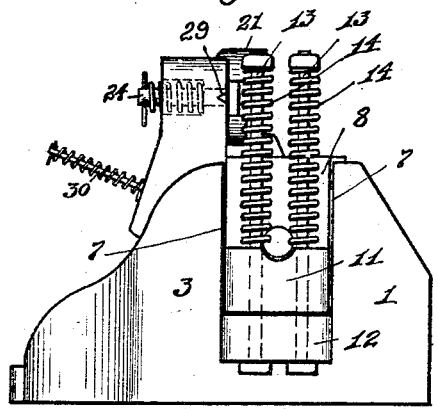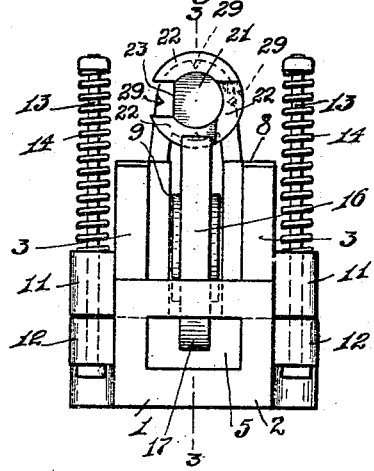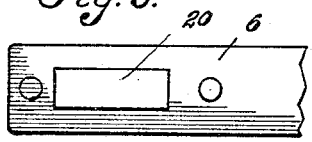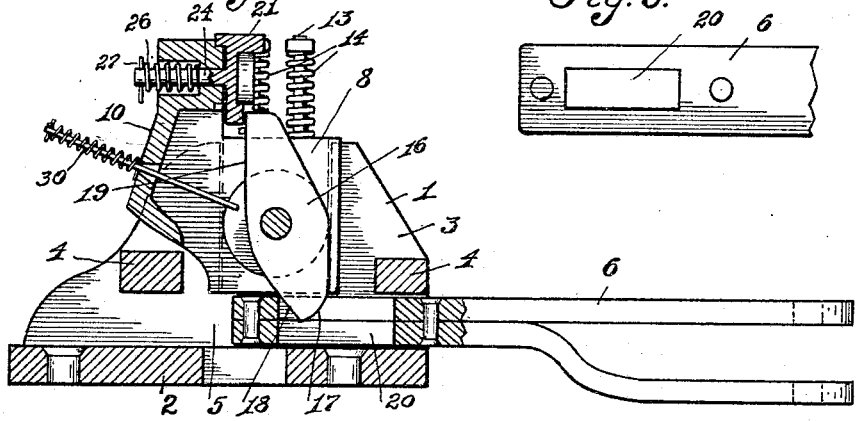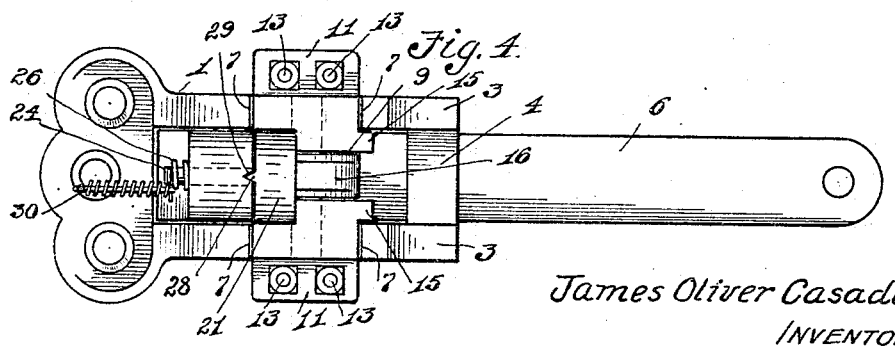

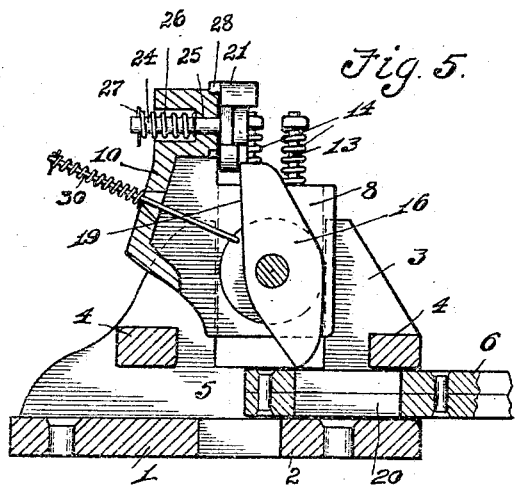
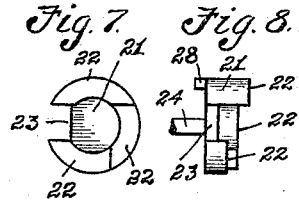
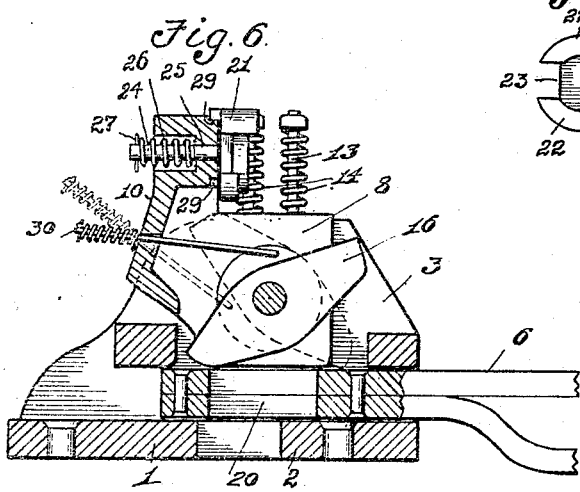

JAMES OLIVER CASADAY, OF SOUTH BEND, INDIANA.

AUTOMATIC-RELEASE DRAFT-COUPLING.

1,298,004. Specification of Letters Patent. Patented Mar. 25, 1919.

Application filed May 13, 1918. Serial No. 234,224.

*To all whom it may concern:*

Be it known that I, JAMES OLIVER CASA-DAY, a citizen of the United States, residing at South Bend, in the county of St. Joseph and State of Indiana, have invented certain new and useful Improvements in Automatic-Release Draft-Couplings, of which the following is a specification.

This invention relates to an automatic release connector or coupling, designed particularly for use in the draft connection of a tractor and following implement, as a plow or the like, whereby to automatically disconnect the tractor and implement in the event of the necessity of more than a predetermined power pull by the tractor on the implement, so that if an unusual obstruction is encountered by the implement, the same is released from draft connection with the tractor to avoid breakage.

With the usual coupling, the tractor will exert its full limit of power if an obstruction is met by the implement, with the consequent liability of breakage of the implement. The present invention entirely and automatically avoids this liability, as a more than predetermined resistance by the implement, will automatically release the draw-bar connection.

The improved coupling is further designed to permit a varying range of limit load strain on the implement without release, being constructed for adjustment to maintain the connection under selective limits, whereby implements requiring different draft power, as for example a two, three, or four bottom plow, may be properly operated.

The invention will be described in the following specification, reference being had to the accompanying drawings, in which:—

Figure 1 is a view in side elevation of the improved coupling.

Fig. 2 is an end elevation of the same.

Fig. 3 is a vertical section, partly in elevation, of the same, the draw-bar being shown in place.

Fig. 4 is a plan view of the coupling as in use.

Fig. 5 is a vertical sectional view, with the parts in release position under an excess pull of the tractor.

Fig. 6 is a similar view, with the parts in full lines as when coupling, and in dotted lines as when manually disconnecting the tractor and implement.

Fig. 7 is a face view of the adjusting disk.

Fig. 8 is a side view of the same.

Fig. 9 is a broken plan view of the draw-bar.

The improved coupling comprises a base member 1, designed to be secured to the implement, and including a bottom plate 2, from which rise spaced parallel walls 3. The space between the walls 3 is bridged by bars 4, arranged in spaced parallel relation to the plate 2, and forming therewith a guide or passageway 5 for the insertion of the draw-bar 6.

The walls 3 of the base are cut away at 7, forming transversely alined guideways approximately midway the length of the walls, the guideways extending through the upper edges of the walls, and with a lower limit in line with the upper boundary of the draw-bar passage 5.

A block 8 is mounted for vertical sliding movement in the guideways 7, the block fitting in and slidably bearing against the edge walls of the guideways. The block is cut away or recessed for its full height, and approximately its full length, as at 9, an end wall or web 10 at the rear end of the block, maintaining the integral formation of the block. The sides of the block, at substantially the lower end thereof, are provided with outstanding lugs 11, overlying similar lugs 12 formed on the base. Rods 13, preferably two on each side, are anchored with respect to the base lugs, and extend slidably through the block lugs. Springs 14 encircle the rods, bearing between the headed upper ends of the rods and the lugs 11. Upward movement of the block is thus resisted by the power of the springs.

The walls of the cut-away portion of the block are of greater thickness than the walls 3 of the base, and are extended forwardly beyond the guideways 7, forming lips 15, bearing against the inner surfaces of the walls 3 for guiding purposes.

A dog 16 is pivotally mounted in the cut-away portion 9 of the block, being of a length to extend above and below the main portion of the block, and capable of swinging to a horizontal or approximately horizontal position, when not obstructed. In side elevation, the dog, when seen in an operative position, as in Fig. 3, has its rearward edge extending vertically, at approximately right angles to the axis of the dog in the portion above the pivot, as at 19, and rearwardly inclined in the portion below the pivot, as at 18. The face or edge of the dog is rounded as at 17, on its lower portion, and otherwise of any desired form, so long as the center of gravity is below the pivot.

With the draw-bar 6, which, aside from a slot 20 to receive the lower end of the dog, may be of any desired construction, inserted in the passageway 5, the lower end of the dog, that is the inclined face 18, will, under the draft pull, bear against the wall of the slot 20. If the upper end of the dog is held against swinging, the connection of the draw-bar and coupling will be maintained until the pull overcomes the resistance of the springs 14, whereupon the block will be forced upwardly and the draw-bar released. If the means for holding the upper end of the dog is adjustable, that is capable of holding the dog in locking position with the inclined portion 18 at different angular relations to the vertical, correspondingly different degrees of pull will obviously be necessary to raise the block to release the draw-bar.

This capability of adjustment in the above respect forms an important part of the present invention, and the structure for carrying out this object includes a limit disk 21, rotatably mounted on the block 8. The disk is formed with projecting lips or flanges 22, each of a different length axially of the disk. Three such limit flanges are here shown, an appropriate space of the disk beyond such flanges, being cut away at 23 to permit free passage of the upper end of the dog beyond holding position, when it is desired to manually release the draw-bar.

The disk 21 has a projecting stem or shaft 24 rotatably mounted in an opening 25 in an upper extension of the block 8, the rearward portion of the opening 25 being enlarged to house a coil-spring 26, bearing against a pin 27 passing through the stem. The rearward face of the disk 21 has a projection 28 adapted to engage any one of a series of recesses 29, in the face of the block portion against which the disk bears, to hold the disk in adjusted position, the spring maintaining the adjustment provided against accidental disturbance.

The disk may thus be set to hold the upper end of the dog, to vary the angular relation to the vertical of the inclined face 18 of such dog, and thereby vary the load strain necessary to raise the block to release the draw-bar. If the disk is adjusted to position the cut-away portion 23 in line with the dog, there is no interruption to the free swinging of the dog, and the draw-bar may be freely removed, as is desired when manually uncoupling the parts.

A spring-pressed setting pin 30 is mounted in the web 10 of the block for limited sliding and swinging movement, so as to move the dog as desired, when adjustment is required, and prevent undue movement of the dog in release movement. The rounded portion or edge 17 of the dog, permits ready coupling of the parts, as will be apparent.

As the block, under release action moves vertically, that is at an angle to the line of pull, it is apparent that the resisting springs may be much lighter than if the resistance were in line with the pull. This permits the parts to be made lighter and smaller than would otherwise be the case.

Having thus described the invention, what is claimed as new, is:—

1. An automatic release draw bar connector, comprising a dog having an inclined edge to engage and hold the draw bar, means to resist movement of the dog under the pull of the draw bar, and means to adjust the inclination of the draw bar engaging edge of the dog.

2. An automatic release draw bar connector, comprising a base, a block slidably mounted therein, a dog carried by the block and having an edge formed to engage the draw bar, means for holding the dog against movement under the draw bar pull independently of the block movement, and means for resisting the movement of the block.

3. An automatic release draw bar connector, comprising a base, a spring pressed block slidably mounted in the base, a dog pivotally mounted in the block and formed at the lower end to engage the draw bar, and means for holding the upper end of the dog against swinging movement under the draw bar pull.

4. An automatic release draw bar connector, comprising a base, a spring pressed block movable therein, a dog pivotally mounted in the block and formed at the lower end to engage and hold the draw bar, and means for holding the upper end of the dog against swinging movement under the draw bar pull, said means being adjustable.

5. An automatic release draw bar connector, comprising a base, a spring pressed block slidably mounted therein, a dog pivotally mounted in the block and having an inclined lower edge to engage and hold the draw bar, a disk mounted in the block to engage and hold the upper end of the dog against movement under the draw bar pull, said disk being formed with an opening to permit free swinging movement of the dog.

6. An automatic release draw bar connector, comprising a base, a block vertically movable therein, a draw-bar engaging dog pivoted in the block and formed to compel an upward movement of the block under a predetermined pull on the dog; and springs for resisting such upward movement of the block.

7. An automatic release draw bar connector, comprising a base, a block vertically movable therein, a dog pivotally mounted in the block and having a lower inclined edge to engage and hold the draw bar, and means having a series of independent dog engaging portions for holding the upper end of the dog against swinging under the pull of the draw bar.

8. An automatic release draw bar connector, comprising a base, a block vertically movable therein, a dog pivotally mounted in the block and having a lower draw bar engaging edge arranged at an angle to the plane of movement of the block, and means for holding the upper end of the dog to vary the angle of this draw bar engaging edge.

9. An automatic release draw bar connector, comprising a base, a block vertically movable therein, a dog pivotally mounted in the block, the lower edge of the dog being angularly disposed with relation to the plane of movement of the block, a stop disk to limit movement of the upper end of the dog, and a series of different length dog engaging flanges carried by said disk.

10. An automatic release draw bar connector, comprising a base, a spring pressed block vertically movable therein, a dog pivotally mounted in the block, the lower end of the dog having an inclined edge to engage and hold the draw bar, a disk rotatably mounted in the block and having a series of different length flanges to engage the upper end of the dog to prevent swinging movement of the dog under pull of the draft bar, and means for adjusting the disk to arrange any one of the flanges in dog holding relation.

11. An automatic release draw bar connector, comprising a base adapted to receive the draw bar, resisting means moving at right angles to the direction of movement of the draw bar, a connection between said means and draw bar to compel a movement of such means under a predetermined pull on the draw bar, the movement of such means withdrawing the connection with the draw bar to release the same.

In testimony whereof I affix my signature.

JAMES OLIVER CASADAY.

Copies of this patent may be obtained for five cents each, by addressing the "Commissioner of Patents, Washington, D. C."